(12) United States Patent
Lahoda et al.

(10) Patent No.: US 7,976,693 B2
(45) Date of Patent: Jul. 12, 2011

(54) HYDROGEN GENERATION PROCESS WITH DUAL PRESSURE MULTI STAGE ELECTROLYSIS

(75) Inventors: Edward J. Lahoda, Pittsburgh, PA (US); David F. McLaughlin, Oakmont, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1028 days.

(21) Appl. No.: 11/778,863

(22) Filed: Jul. 17, 2007

(65) Prior Publication Data

US 2009/0020436 A1 Jan. 22, 2009

Related U.S. Application Data

(60) Provisional application No. 60/831,332, filed on Jul. 17, 2006.

(51) Int. Cl.
*C25B 1/02* (2006.01)
*C01B 17/50* (2006.01)

(52) U.S. Cl. ............... 205/554; 205/637; 423/539
(58) Field of Classification Search .................. 205/554, 205/637; 423/539
See application file for complete search history.

(56) References Cited

U.S. PATENT DOCUMENTS

| 3,888,750 | A | 6/1975 | Brecher et al. | |
|---|---|---|---|---|
| 4,412,895 | A * | 11/1983 | Lu | 205/637 |
| 7,491,309 | B2 * | 2/2009 | Peter et al. | 205/629 |
| 2005/0000825 | A1 * | 1/2005 | Nomura et al. | 205/637 |
| 2005/0077187 | A1 * | 4/2005 | Nakagiri | 205/637 |
| 2006/0000721 | A1 * | 1/2006 | Naito et al. | 205/637 |
| 2006/0002845 | A1 | 1/2006 | Lahoda et al. | |
| 2006/0013761 | A1 | 1/2006 | Lahoda et al. | |
| 2006/0272956 | A1 * | 12/2006 | Felder et al. | 205/637 |
| 2007/0007147 | A1 | 1/2007 | Lahoda | |
| 2009/0000956 | A1 * | 1/2009 | Weidner et al. | 205/637 |

FOREIGN PATENT DOCUMENTS

WO  WO 2007/004997 A1  1/2007

OTHER PUBLICATIONS

Goosen et al."Improvements in the Westinghouse Process for Hydrogen Production" American Nuclear Society Global Paper #88017, American Nuclear Society Annual Winter Meeting New Orleans, Louisiana, USA, Nov. 2003.
Equilibrium Thermodynamics, James Coull and Edward B. Stuart, Copyright 1964 by John Wiley & Sons, Inc., "The Rankine Cycle," pp. 344-346.
Carty R et al., "Process Sensitivity Studies on the Westinghouse Sulfur Cycle For Hydrogen Generation", Introduction, Process simulation . . . , vol. 2, No. 1, 1977, pp. 17-22.

* cited by examiner

*Primary Examiner* — Wayne Langel (57) ABSTRACT

A multi-pressure hybrid sulfur process (2) contains at least one electrolyzer unit (16) which provides liquid $H_2SO_4$ to a preheater/vaporizer reactor (20) operating at a pressure of from 1 MPa to 9 MPa to form gaseous $H_2SO_4$ which is passed to a decomposition reactor (14) operating at a pressure of from 7 MPa to 9 MPa, where decomposed $H_2SO_4$ is passed to at least one scrubber unit (14) and at least one electrolyzer unit (16) both preferably operating at a pressure of 0.1 MPa to 7 MPa, where an associated Rankine Cycle power conversion unit (50) supplies electricity.

9 Claims, 6 Drawing Sheets

HYDROGEN GENERATION PROCESS WITH DUAL PRESSURE MULTI STAGE ELECTROLYSIS

CROSS-REFERENCE TO RELATED APPLICATIONS

The instant application claims priority from Provisional Application No. 60/831,332 filed on Jul. 17, 2006.

BACKGROUND OF THE INVENTION

The sulfur cycles are a group of thermochemical processes that can make hydrogen, mainly using high temperature thermal energy from a high temperature heat source. The Westinghouse Sulfur Process (WSP; also known as the HyS or Hybrid Sulfur Process), FIG. 1 and the Sulfur Iodine (S/I) Process, FIG. 2 are two processes in this category. The high temperature heat sources are any that produce heat, available for use, above about 800° C., such as a High-Temperature Gas-Cooled Nuclear Reactor (HTGR) or a natural gas fired combustor.

The Westinghouse Sulfur Process produces hydrogen in a low-temperature electrochemical step, in which sulfuric acid and hydrogen are produced from sulfurous acid. This reaction can be run at between 0.17 and 0.6 volts with a current density of about 500 ma/sq.cm at about 60° C. The second step in the cycle is the high temperature decomposition of sulfuric acid at 760° C. or above. Previous work by Westinghouse has identified catalysts and process designs to carry out this reaction in concert with an HTGR such as the PBMR. The final step in this process is absorption of the $SO_2$ in water at room temperature to form sulfurous acid and a $SO_2$ free stream of $O_2$. This is a well known process which is hereby defined as "standard WSP":

$H_2SO_4 \leftrightarrows SO_3+H_2O \leftrightarrows SO_2+0.5O_2+H_2O$ (>760° C. heat required); (1)

$SO_2+2H_2O+0.5O_2 \leftrightarrows H_2SO_3+H_2O+0.5O_2$ (T<100° C.); and (2)

$H_2O+H_2SO_3 \rightarrow H_2+H_2SO_4$ (electrolyzer at about 100° C. or less). (3)

The Iodine/Sulfur Process also starts with a reversible reaction where sulfuric acid is decomposed at over 760° C. to form sulfur dioxide as above, followed by the reaction of the sulfur dioxide with Iodine to form HI. This is a well known process which is hereby defined as "standard S/I":

$H_2SO_4 \leftrightarrows SO_3+H_2O \leftrightarrows SO_2+0.5O_2+H_2O$ (>760° C. heat required); (1)

$I_2+SO_2+2H_2O+0.5O_2+\text{excess } H_2O \leftrightarrows 2HI+H_2SO_4+0.5O_2+\text{excess } H_2O$ (about 100° C. to 200° C. heat generated); and (2)

$2HI \leftrightarrows H_2+I_2$ (greater than 400° C. heat required). (3)

The common step in both processes is:

$H_2SO_4 \leftrightarrows SO_2+H_2O+0.5O_2$

These standard WSP and standard S/I processes are described in detail by Lahoda et al. in U.S. Publication No. US 2006/0002845 A1.

Goosen et al."Improvements in the Westinghouse Process for Hydrogen Production" *American Nuclear Society Global Paper* #88017, American Nuclear Society Annual Winter Meeting New Orleans, Louisiana, USA, November 2003, also describes the Westinghouse Sulfur Process and compares it with the Sulfur Iodine Process. Westinghouse process economics are described as well as integration with a nuclear High Temperature Gas Cooled Reactor (HTGR) such as a Pebble Bed Modular Reactor (PBMR) to drive reactions by delivering temperatures of about 800° C.-900° C. to $H_2SO_4$ reactors in the WSP or S/I Processes.

After the $H_2SO_4$ Decomposition Reactor (a process step common to both the standard WPS and S/I processes), the hot gas from the primary loop of a HTGR is sent to a Power Conversion Unit (PCU), consisting of a set of gas turbines where the remaining energy is extracted. Unfortunately, after extraction of the high quality heat needed for $H_2SO_4$ decomposition, the temperature of the gas is no longer high enough to take full advantage of the high efficiencies available from preferred Brayton cycle gas turbines.

Figure 1:
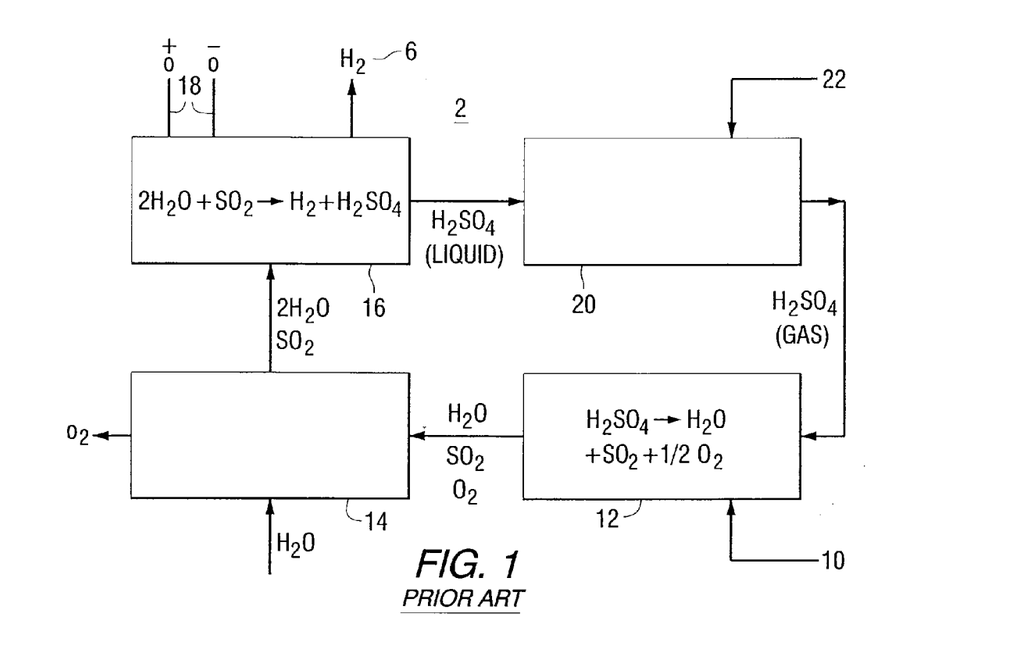
FIG. 1 is a prior art block diagram of a Westinghouse Sulfur Process.
Figure 2:
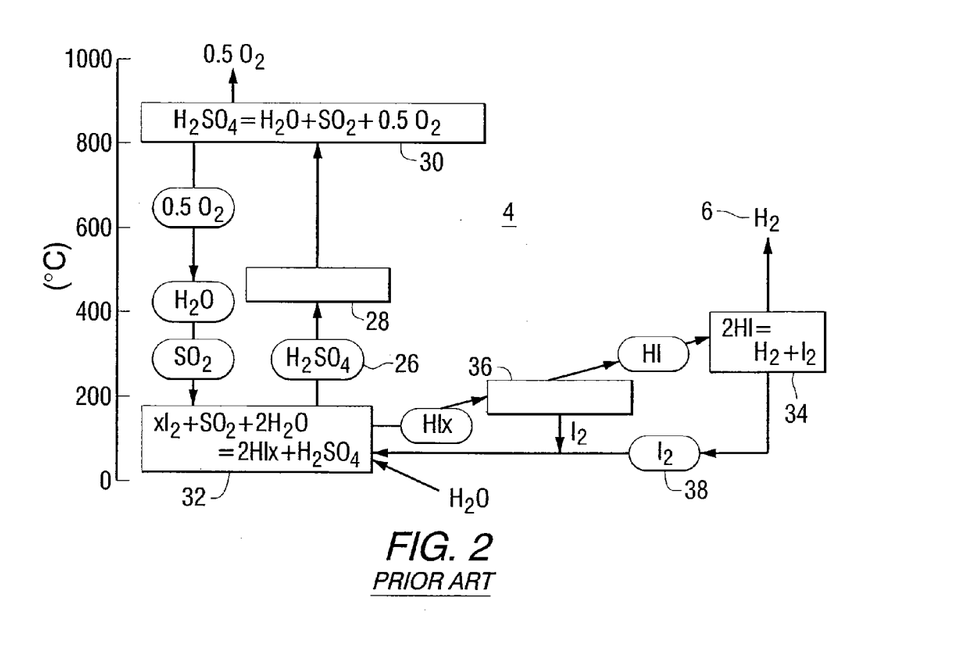
FIG. 2 is a prior art block diagram of a Sulfur Iodine Process.

The portion of the process where sulfuric acid is decomposed into sulfur dioxide, water vapor and oxygen, 12 in FIG. 1, typically takes place at high temperatures. Due to the lower condensation temperature of the Decomposition Reactor product stream compared to the feed stream, the $SO_2/H_2O/O_2$ outlet of the preheater/vaporization unit, 20 in FIG. 1, must be kept at a relatively high temperature, typically approximately 260° C. at 9 MPa. (1 MPa=145 pounds/sq. in "psi"). As a result, the amount of heat that can be recovered in the preheater is limited. The $SO_2/O_2/H_2O$ stream must eventually be cooled to approximately 90° C. before being introduced to $SO_2$ scrubbers, shown generally as 14 in FIG. 1, so that this cooling duty represents a significant loss of energy.

The preheating/vaporization unit, 20 in FIG. 1 presents a severe materials issue as well. As it is evaporated, water is boiled off first, so that this stream changes in the Preheater from a relatively dilute $H_2SO_4$ solution of around 30% to 50% by weight, to a concentrated solution of 80% to 95% by weight $H_2SO_4$ when the highest temperatures are reached. While there are materials that can operate at the required temperatures (200° to 700° C.), they are very expensive.

Another inefficiency that is built into the process is evaporation and condensation of water that enters with the feed $H_2SO_4$. The sulfuric acid feed is typically 30% to 50% weight, so that a large amount of water is preheated and evaporated, only to be condensed and recirculated. The heat of vaporization of this water represents another substantial energy penalty. The decomposition process is typically aided by the presence of catalysts, and any water in the feed to the decomposition process can significantly reduce the decomposition catalyst life.

After cooling, the $SO_2/O_2/H_2O$ stream is sent to the $SO_2$ scrubber and $O_2$ recovery until, generally shown as 14 in FIG. 1, where $SO_2$ is absorbed into water to make sulfurous acid ($H_2O+SO_2 \leftrightarrows H_2SO_3$). This sulfurous acid is then fed to an aqueous phase electrolysis cell, 16 in FIG. 1, where the sulfurous acid is oxidized to sulfuric acid, generating hydrogen product ($2H_2O+SO_2 \leftrightarrows H_2+H_2SO_4$). In order for the electrolysis step to work efficiently, the $SO_2$ must remain dissolved in the water. Sulfur dioxide has a limited aqueous solubility. Increasing the pressure increases the amount of $SO_2$ that can be absorbed into the scrubber solution, decreases the level of $SO_2$ in the $O_2$ product, and decreases the amount of makeup $SO_2$ that must be provided. However, increasing pressure also increases the cost of the process equipment, especially the vessels that contain the electrolysis units.

Thus, there continually remains a need to reduce operating temperatures and pressures so that low cost steels can be used and to increase efficiencies. It is a main object of this invention to provide a system using low temperatures, low pressures and high efficiencies.

SUMMARY OF THE INVENTION

Accordingly the above needs are met and object achieved by providing a hybrid sulfur process that utilizes a dual pressure system comprising a $H_2SO_4$ vaporization unit, a $H_2SO_4$ disassociation decomposition reactor operating at a pressure of from 7 MPa to 9 MPa, a product cooler and an $SO_2$ recovery process that also generates $O_2$, operating at a pressure of 0.1 MPa to 7 MPa feeding to an electrolyzer producing $H_2$ at same pressure.

This invention also resides in a hybrid sulfur process which comprises (a) a sulfur cycle, selected from the group consisting of a Westinghouse Sulfur Process and a Sulfur Iodine Process, comprising an electrolyzer which provides $H_2SO_4$ liquid to a $H_2SO_4$ vaporizer reactor operating at a pressure of from 1 MPa to 9 MPa and a temperature effective to provide vaporized gaseous $H_2SO_4$ which is decomposed to gaseous $H_2O$, $SO_2$ and $O_2$ in a decomposition reactor operating at a pressure of from 7 MPa to 9 Mpa, which gases are passed to at least one $SO_2$ scrubber unit(s) operated with at least one electrolyzer unit, where input electricity to the electrolyzer unit(s) result in the production of hydrogen gas and $H_2SO_4$ liquid, where both the $SO_2$ scrubber unit(s) and the electrolyzer units operate at a pressure of 0.1 MPa to 7 MPa; (b) Rankine Cycle Power Conversion Unit, which supplies electricity to at least the electrolyzer unit(s); and (c) a heat source selected from the group consisting of a nuclear reactor and a gas fired combustor, which supplies fluid heat to the Rankine Cycle Unit and the sulfur cycle.

BRIEF DESCRIPTION OF THE DRAWINGS

For a better understanding of the invention, reference may be made to the following description, taken in connection with the accompanying drawings in which.

DETAILED DESCRIPTION OF THE PREFERRED EMBODIMENTS

Back now to prior art FIGS. 1 and 2 before proceeding further with the invention. FIG. 1, illustrates a standard WSP process 2 shown operating at less than 900 psi. In FIG. 2, the standard S/I process 4 is shown operating at less than 900 psi. In FIG. 1, thermal energy 10 at about 760° C. to 1000° C. is passed into oxygen generator/sulfuric acid Decomposition Reactor 12 to provide the reaction shown, passing $H_2O$, $SO_2$ and $O_2$ to an oxygen recovery/$SO_2$ scrubber unit 14 where $H_2O$ and $SO_2$ are passed to an electrolyzer 16 energized with D.C. electricity 18 to provide $H_2$ shown as 6 and $H_2SO_4$, where the latter is vaporized in preheater/vaporizer 20 by thermal energy 22 to feed vaporized $H_2SO_4$ to the oxygen generator/sulfuric acid decomposition reactor 12, as shown.

As shown in FIG. 2, a Sakuri 2000 process schematic of the reactions for S/I vs. temperature, Sulfuric acid 26 is vaporized in vaporizer 28 and then passed to decomposition reactor 30 at about 760° C. to 810° C. to generate $O_2$ and pass $O_2$, $H_2O$ and $SO_2$ to iodine reactor 32 which generates HI which is decomposed in second decomposition reactor 34 to provide $H_2$ shown as 6 after passing through the excess 12 separator 36. The decomposition reactor 34 provides the main source of 12, shown as 38 for the iodine reactor 32, also known as a Bunsen reactor.

By operating the entire WSP or S/I cycle at a high pressure of roughly 1450 psi (10.0 MPa-mega pascals), $SO_2$ can be removed from the system in Unit 14 at temperatures above 20° C. to 75° C., without the use of energetically inefficient refrigeration systems or excess water.

Figure 3:
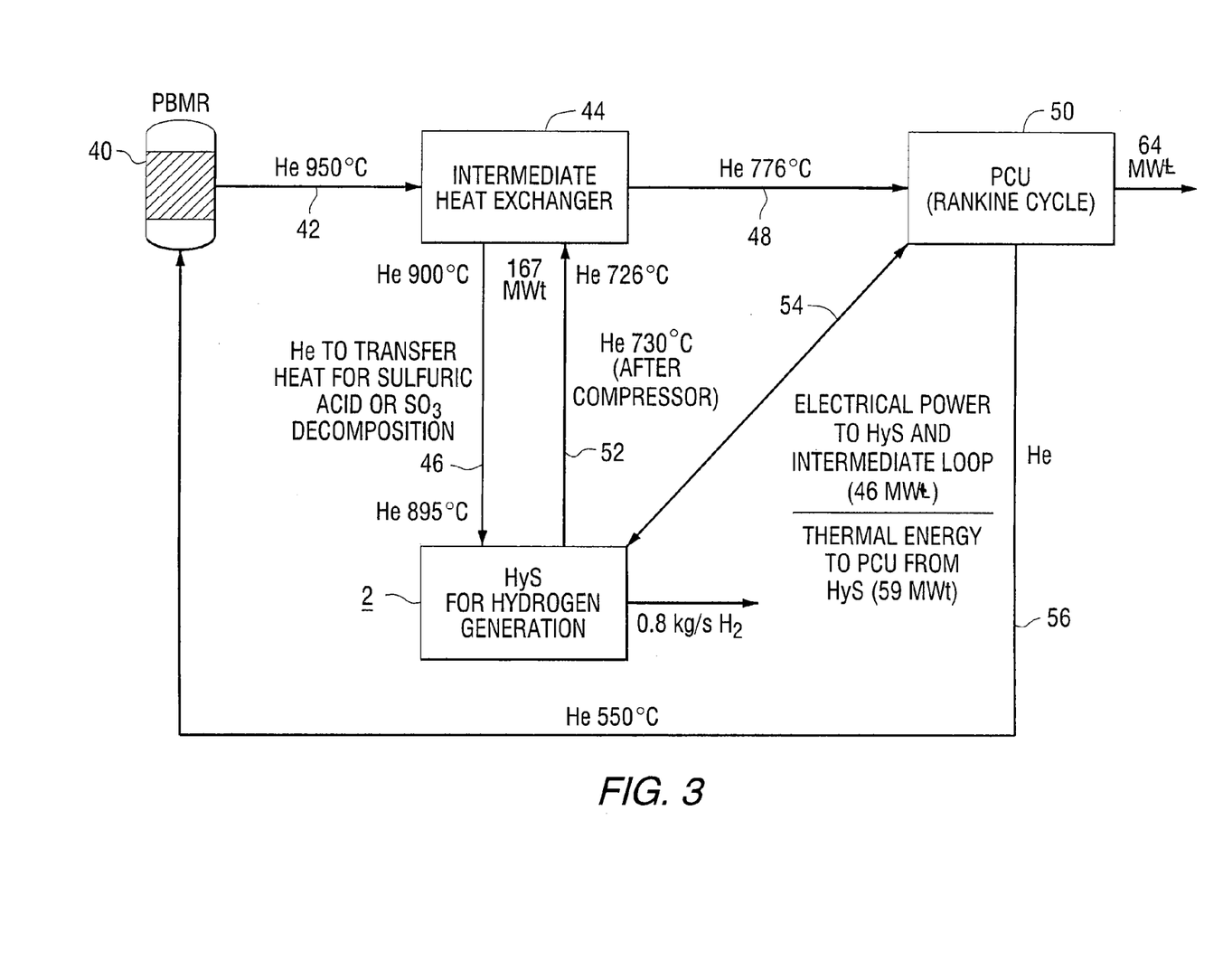
FIG. 3, which best describes the invention is one example of an integrated flow diagram of a hybrid sulfur process using a Rankine Cycle and hydrogen production.

A variety of advances are proposed, that, when taken together, solve most of the issues discussed at the end of the SUMMARY. The first is to use an integrated process that preferably uses a steam based Rankine Cycle for electrical generation. This unusual approach is shown in FIG. 3.

For high temperature heat sources, a Brayton cycle utilizing a gas turbine is more efficient that a Rankine cycle that uses steam as an intermediate fluid between the high temperature hot gas source and the Turbine. However, as the temperature of the hot gas source decreases to about 750° C., the Rankine cycle becomes more efficient than the Brayton cycle. This is the case when using the high temperature heat source to first decompose $H_2SO_4$. The resulting temperature is about 750° C. and results, surprisingly, in a Rankine cycle effectiveness that is greater than Brayton effectiveness.

Cooling the $SO_2/O_2/H_2O$ mixture to 90° C., in or before Unit 14, from the outlet temperature of the $H_2SO_4$ reactor 12 amounts to a considerable heat duty, (See Table 1 below):

TABLE 1

Effect of Pressure on Energy Delivered to Power Conversion unit (PCT) and Net WSP Process Efficiency

| Pressure (MPa) | $SO_x$ Stream Temperature to $SO_2$ Scrubber Cooler (° C.) | MW(t) Transferred to PCU/Total Available | Hydrogen Production Rate (kg/sec) | WSP Process Efficiency |
|---|---|---|---|---|
| 9 | 262 | 59.2/59.2 | 0.797 | 42.0% |
| 8 | 259 | 61.4/61.4 | 0.778 | 42.0% |
| 7 | 255 | 63.7/65.2 | 0.748 | 41.5% |
| 6 | 249 | 60.5/66.4 | 0.725 | 40.3% |
| 5 | 240 | 56.1/70.5 | 0.704 | 38.9% |
| 4 | 229 | 50.7/71.2 | 0.682 | 37.3% |

If the heat from the $SO_2/O_2/H_2O$ mixture is cooled using a water cooled heat exchanger/$SO_2$ scrubber unit, 14 of FIG. 1, by using the hot $SO_2/O_2/H_2O$ stream to preheat the feed water to the Rankine cycle power conversion unit, as shown in FIG. 3, heat can be beneficially used. However, the amount of heat that can be beneficially used depends upon the inlet temperature of the $SO_2/O_2/H_2O$ stream and on the boiling temperature of the Rankine cycle. The temperatures of these streams in turn depend upon the pressures in the Decomposition Reactor and Rankine cycle boiler. Calculations have indicated that for an 18 MPa Rankine cycle PCU, the percentage of energy that can be beneficially used for feed water preheat is significantly lower than 100% if the pressure in the Decomposition Reactor, 12 in FIG. 1, is below 7 to 9 MPa.

Figure 4:
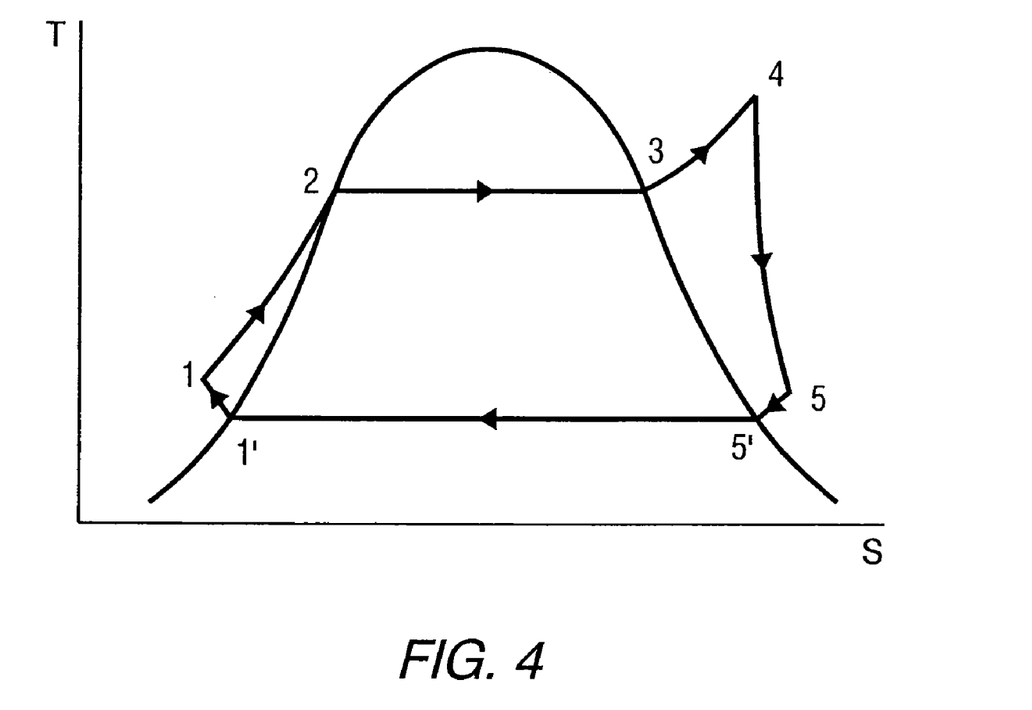
FIG. 4 illustrates the operation of an actual Rankine cycle.

An actual Rankine cycle is accompanied by inefficiencies. The T-S diagram in FIG. 4 shows an actual cycle. The path shown as (1') to (1) represents the pumping of the working fluid back to the high pressure of the boiler.

The path shown as (1) to (2) represents the preheating of the boiler feedwater carried out by the $SO_2/O_2/H_2O$ stream. The path shown as (2) to (3) represents the boiling of the water by the hot He from the exit of the decomposition reactor. Since a wet vapor will erode the turbine blades, the vapor is usually superheated to condition (4). The expansion may have some inefficiencies and hence not be adiabatic and reversible, so that the expansion step is shown in path (4) to (5) as having a slight increase in entropy. The vapor leaving the turbine may not be saturated so that the omitted portion of the heat exchanger removes sensible heat from the vapor as in step (5) to (5'). More detail can be found in *Equilibrium Thermodynamics* James Coull and Edward Stuart, John Wiley & Sons, 1964, pages 344-346.

Very importantly, a dual-pressure system is proposed for the inventive process of this invention. The Decomposition Reactor, 12 in FIG. 1, is operated at 7 to 9 MPa, where essentially all of the $SO_x$ cooling duty can be recovered as PCU-Rankine Cycle-feed water preheat. To substantially reduce cost in the $SO_2$ scrubbing-electrolysis processes, Units 14-16 of FIG. 1, the pressure of this portion of the system, Units 14 and 16 in FIG. 1, is reduced below the Decomposition Reactor 12 pressure of 7 to 9 MPa. The low pressure side of the Hybrid Sulfur Process, 14-16 in FIG. 1, however, must still maintain a pressure high enough to absorb the $SO_2$ produced in the Decomposition Reactor 12 in the feed solution to the electrolyzer. Otherwise, excessive amounts of $SO_2$ are lost with the $O_2$ product and create a problem as shown in Table 2 below:

TABLE 2

$SO_2$ Loss to $O_2$ Stream as Function of Pressure and Number of Absorption/Electrolysis

| Pressure (MPa) | Single/Three Stage SO2 Losses to O2 Product (kg/hr) | Single/Three Stage % $SO_2$ in $O_2$ |
|---|---|---|
| 9 | 0.46/0.006 | 6.7%/0.094% |
| 8 | 0.755/0.020 | 11%/0.32% |
| 7 | 1.4/0.111 | 19%/1.18% |
| 6 | 2.6/0.472 | 31%/7.5% |
| 5 | 5.0/1.57 | 47%/22% |
| 4 | 11.0/4.11 | 66%/43% |

Figure 6:
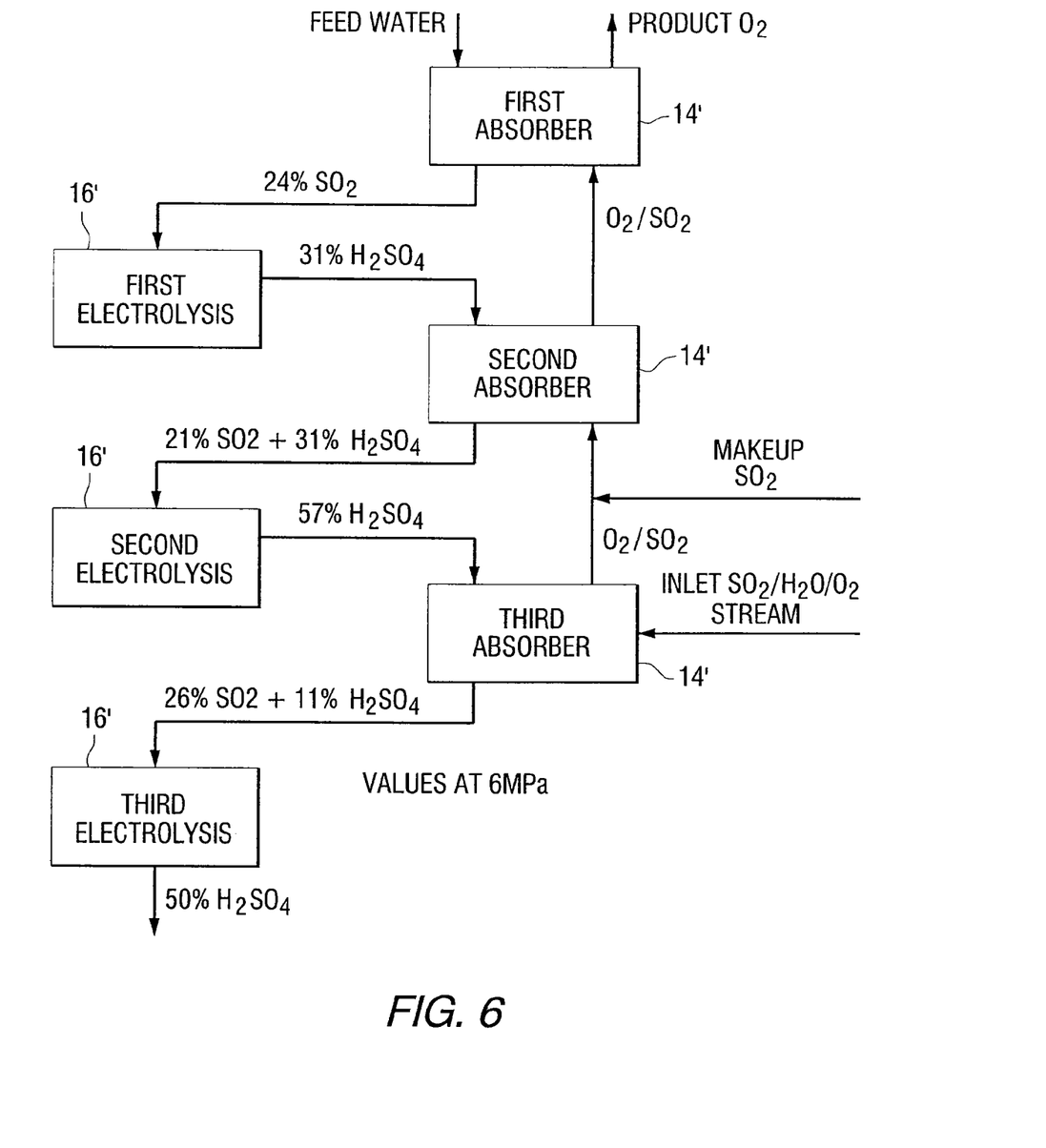
FIG. 6 is a block diagram illustrating a multistage $SO_2$ absorber electrolysis system in parallel.

To solve this problem, very importantly, a multi-staged $SO_2$ absorption/electrolysis process is proposed as a preferred embodiment, as shown in FIG. 6. The figure illustrates a system with three parallel, 14', 14', 14'/16', 16', 16', $SO_2$ absorber-absorption/electrolysis stages, although as many stages as are necessary to produce the desired $SO_2$ in $O_2$ level can be used-a plurality of preferably parallel stages. In this important approach, $SO_2$ is absorbed and electrolyzed to $H_2SO_4$ in several stages. The sulfuric acid leaving each electrolysis stage is therefore depleted in $SO_2$, allowing the acid to be efficiently used as the scrubbing liquor for the next absorption stage in the cascade. This approach dramatically reduces the $SO_2$ lost to the $O_2$, while still operating at a significantly lower pressure than is required in the Decomposition Reactor (see text and Table 1). From a practical point of view, this approach, therefore, substantially lowers the cost of the equipment in the electrolysis area by lowering the pressure, making the entire process more commercially feasible.

Referring now back to FIG. 3, a diagram illustrating a PCU—Hybrid Sulfur System is shown where thermal energy losses are minimized. Nuclear reactor or gas fired combustor 40, shown here as a PBMR, provides fluid heat 42, here He at 950° C. to a first intermediate heat exchanger 44 which passes heat 46 to a hybrid sulfur process such as shown in FIGS. 1 or 2, here a WSP 2 and also passes heat 48 to a Rankine Cycle PCU 50, at about 776° C. Any fluid heat 52, out of the WSP, 2, is passed back to the first intermediate heat exchanger 44. Electrical power 54 from the Rankine Cycle 50 is used to power an electrolyzer, shown in FIG. 1 as Unit 16, in the WSP, 2. The Rankine Cycle passes cooled fluid heat 56 back to PBMR, 40, all as shown in FIG. 3 in complete detail including He temperatures an energy data.

In this invention a hybrid sulfur process such as for example generally shown in FIG. 1, a WSP comprises: (1) a sulfur cycle, preferably a Westinghouse Sulfur Process 2 comprising an electrolyzer 16 which provides $H_2SO_4$ liquid to a $H_2SO_4$ preheater/vaporizer/decomposition reactor 20, shown in FIG. 1, operating at a pressure of from 1 MPa to 9 MPa and a temperature effective to provide vaporized gaseous $H_2SO_4$ which is passed to a sulfuric acid decomposition reactor 12 operating at a temperature over 760° C., utilizing a heat source 10—thermal energy, where decomposed $H_2SO_4$ comprising $H_2O$, $SO_2$ and $O_2$ is passed preferably to a plurality of $SO_2$ scrubber units 14' operated in parallel with a plurality of electrolyzer units 16', as shown in FIG. 6, where input electricity to the electrolyzer units result in the production of hydrogen gas, where both the $SO_2$ scrubber units and the electrolyzer units operate at a pressure of 0.1 MPa to 7 MPa, thus providing a dual pressure system; (2) Rankine Cycle Power Conversion Unit 50, which supplies electricity to the sulfur cycle and the plurality of electrolyzer units; and (3) a heat source 40 selected from the group consisting of a nuclear reactor and a gas fired combustor which supply fluid heat to the Rankine Cycle Unit 50 and the sulfur cycle. The heat source is preferably a nuclear reactor.

Figure 5:
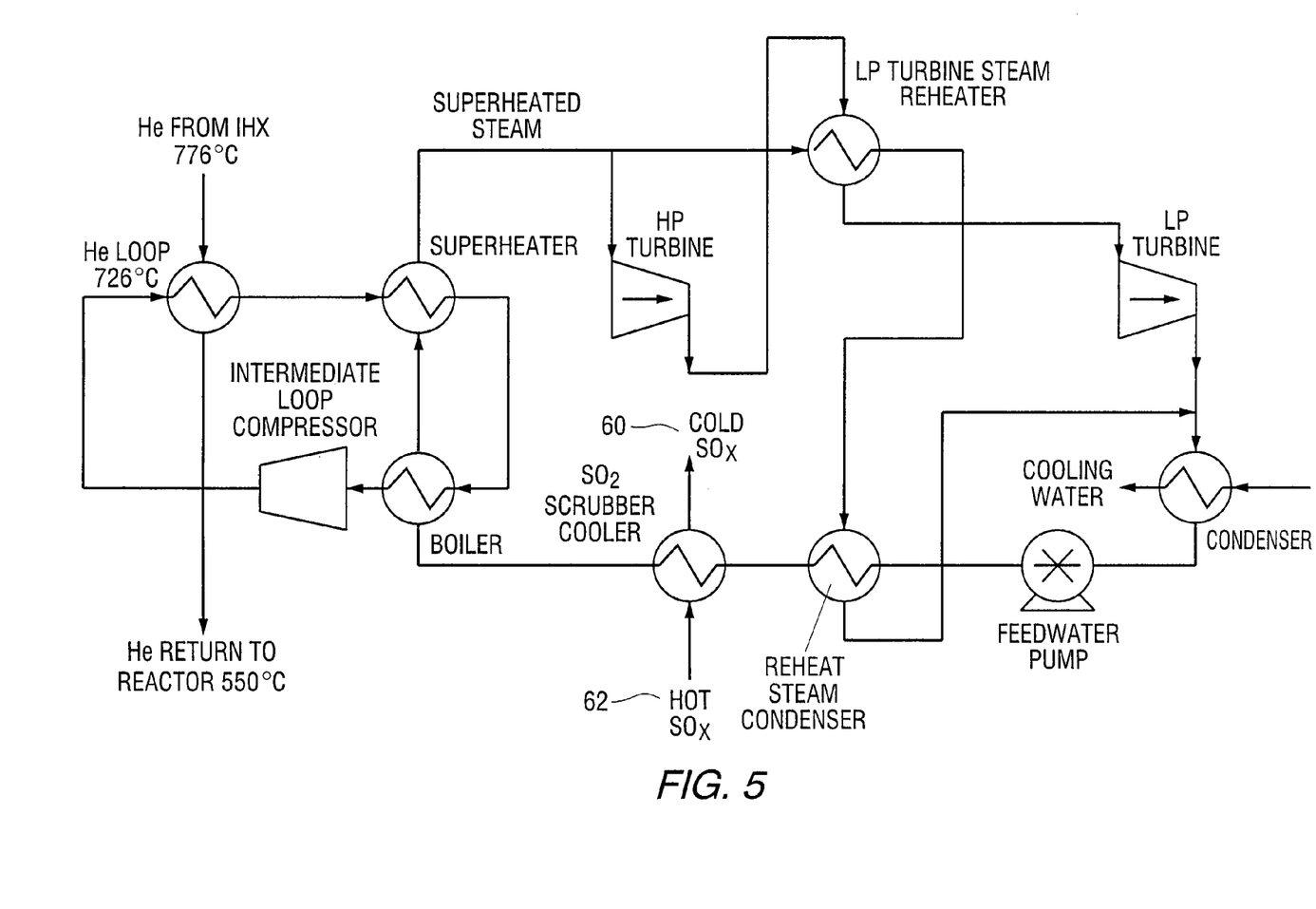
FIG. 5 is a block diagram illustrating the interconnection of PCU and Hybrid Sulfur Systems to minimize thermal energy losses.

Referring now to FIG. 5. FIG. 5 generally shows how the heat from the hot $SO_2/O_2/H_2O$ stream is integrated into the operation of the Rankine Cycle, also shown as 50 in FIG. 3. It also shows how the heat from the gas exiting the decomposition reactor is used to heat the feed water, from feedwater pump shown, to steam. Note that FIG. 5 show a two stage Rankine Turbine Cycle with superheat and reheat. Any number of steam turbine stages with appropriate super and preheat stages can be used as is necessary while still being covered by this invention. In FIG. 5, 60 shows cold $SO_2/O_2/H_2O$ which will pass to the multistage $SO_2$ absorber and 62 shows hot $SO_2/O_2/H_2O$ from the outlet of the decomposition reactor.

Figure 7:
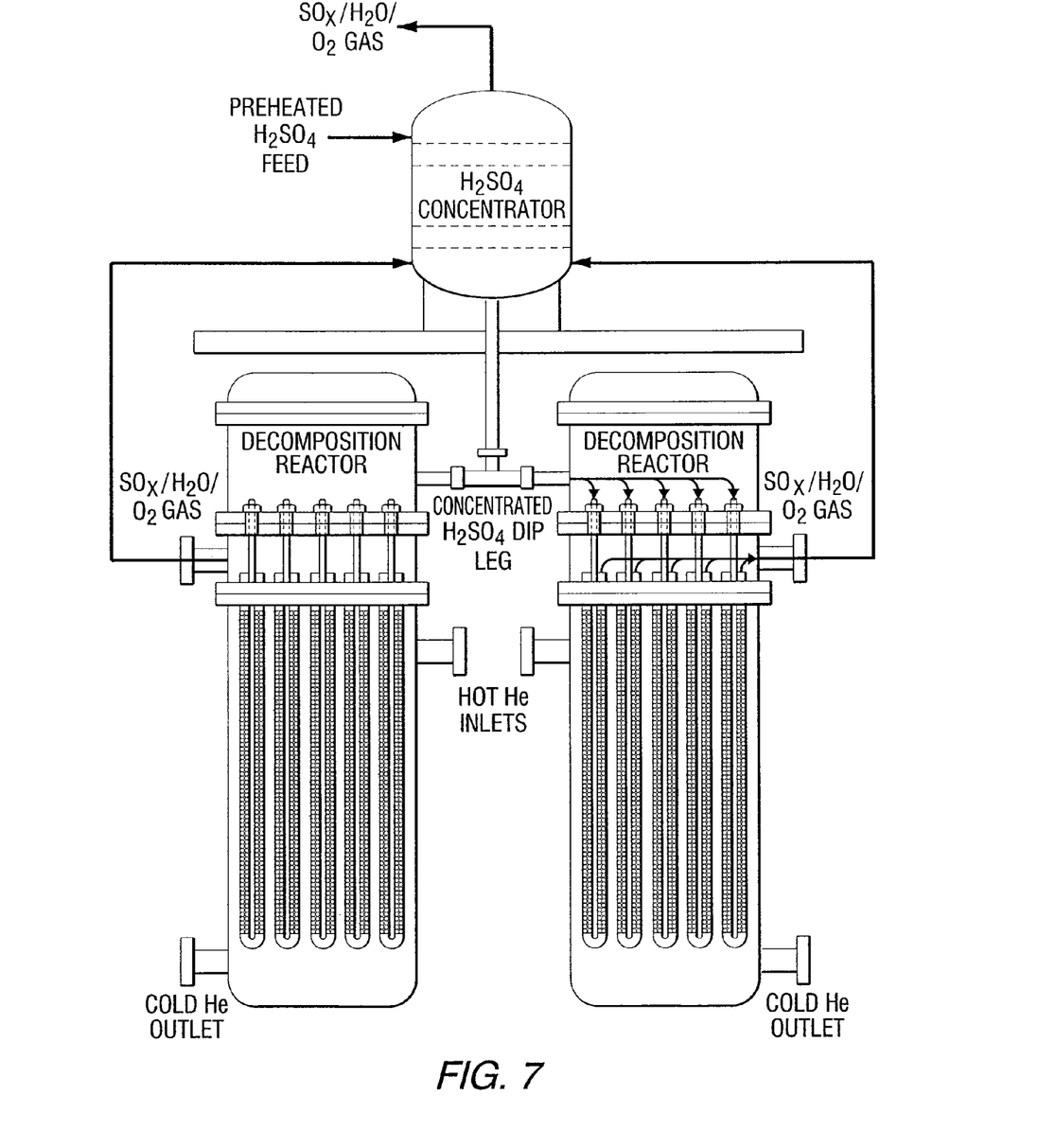
FIG. 7 is an integrated $H_2SO_4$ concentrator and $H_2S$ decomposition reactors.

A further advance is to use a direct contact heat exchanger and $H_2SO_4$ concentrator for the decomposition reactor feed system. Traditional heat exchangers would require very large heat exchange areas and result in very expensive and large pieces of equipment. Use of indirect heat exchange is limited by internal temperature pinches i.e. a point in the heat exchanger where the fluid temperature of the high temperature side approaches the temperature of the low temperature side due to phase changes occurring on both sides of the Preheater. Here, the process produces a very concentrated (80% to 95%) $H_2SO_4$ feed stream for the Decomposition Reactor, shown as 12 in FIG. 1, (significantly reducing the energy duty for evaporating excess water), and efficiently exchanges energy between the Decomposition Reactor products and the feeds. If the $H_2SO_4$ concentrator/vaporizer/preheater, 20 in FIG. 1, is physically located above the Decomposition Reactor, 12 in FIG. 1, as a combination unit, as shown in FIG. 7, the combination eliminates the need for a pump to feed the Decomposition Reactor, since the liquid feed to the reactor is much denser than the products leaving reactor. FIG. 7, in more detail illustrates one potential arrangement of the direct contact concentrator, above in gravity relationship with, decomposition reactors.

In a final design feature, the recycle sulfuric acid is further reduced in pressure with respect to the absorption/electrolysis section to atmospheric pressure. This reduces the cost of the acid storage tank, and allows dissolved $O_2$ and reduced $SO_2$ to off-gas from the acid, reducing the corrosivity of the Decomposition Reactor feed and improving the conversion of the $H_2SO_4$ to $SO_2/O_2/H_2O$, by removing excess products from the feed.

Having described the presently preferred embodiments, it is to be understood that the invention may be otherwise-embodied within the scope of the appended claims.

What is claimed is:

1. A dual pressure hybrid sulfur process for hydrogen generation, utilizing the decomposition of $H_2SO_4$ to $H_2O$, $SO_2$ and $O_2$ with heat from a nuclear reactor or natural gas fired combustor, which comprises:
   (a) utilizing a sulfur cycle, selected from the group consisting of a Westinghouse Sulfur Process and a Sulfur Iodine Process, wherein an electrolyzer provides $H_2SO_4$ liquid to a $H_2SO_4$ vaporizer reactor operating at a pressure and a temperature effective to provide vaporized gaseous $H_2SO_4$; which gaseous $H_2SO_4$ is decomposed to gaseous $H_2O$, $SO_2$ and $O_2$ in a decomposition reactor operating at a pressure of from 7 MPa to 9 MPa;
   (b) passing the $H_2O$, $SO_2$ and $O_2$ gases to a plurality of $SO_2$ scrubber units to remove $O_2$ streams, operating with a plurality of electrolyzer units;
   (c) inputting electricity to the plurality of electrolyzer units to produce hydrogen gas and $H_2SO_4$ liquid, where both the plurality of $SO_2$ scrubber units and the plurality of electrolyzer units operate at a pressure of 0.1 MPa to 7 MPa;
   (d) supplying electricity to the plurality of electrolyzer units utilizing a Rankine Cycle Power Conversion Unit; and
   (e) supplying fluid heat to the Rankine Cycle Unit and the sulfur cycle, utilizing a heat source selected from the group consisting of a nuclear reactor and a natural gas fired combustor;
   where the decomposition reactor operates at a pressure higher than the scrubber and electrolyzer units, providing a dual pressure hybrid process.

2. The hybrid sulfur process of claim 1, wherein a combination heat exchanger and $H_2SO_4$ vaporizer are used to preheat the inlet liquid sulfuric liquid and concentrate it to between 80% and 95% $H_2SO_4$, and feed the hot concentrated $H_2SO_4$ to the decomposition reactor.

3. The hybrid sulfur process of claim 2, wherein the $H_2SO_4$ vaporizer reactor is located above the decomposition reactor, allowing gravity flow of concentrated/gaseous $H_2SO_4$ to eliminate the need for a pump to supply the decomposition reactor.

4. The hybrid sulfur process of claim 1, wherein the plurality of $SO_2$ scrubber units and electrolyzer units reduces $SO_2$ loss to the $O_2$ streams.

5. The hybrid sulfur process of claim 4, wherein $SO_2$ is absorbed and electrolyzed to $H_2SO_4$ in several stages, so that the sulfuric acid leaving each electrolyzer unit is depleted in $SO_2$ allowing acid to be efficiently used in the scrubbing liquid for the next absorption stage.

6. The hybrid sulfur process of claim 1, wherein the Rankine Cycle is steam based and passes cooled fluid heat back to the heat source.

7. The hybrid sulfur process of claim 1, wherein the decomposition reactor is operated at about 750° C.-760° C., to increase the efficiency of the associated Rankine Cycle.

8. The hybrid sulfur process of claim 1, wherein the heat source is a nuclear reactor and the sulfur cycle is a Westinghouse Sulfur Process.

9. The hybrid sulfur process of claim 8, wherein fluid heat from the nuclear reactor is first passed to a heat exchanger then to the Rankine cycle.

* * * * *